United States Patent
Hamilton et al.

(10) Patent No.: US 6,315,435 B1
(45) Date of Patent: Nov. 13, 2001

(54) ELECTRONICALLY CONTROLLED SEARCHLIGHT HAVING MULTIPLE PRESET POSITIONS

(75) Inventors: Scott E. Hamilton, North Lewisburg; Brian J. Barnhart, New Carlisle; Nicolo F. Machi, Urbana, all of OH (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/361,042

(22) Filed: Jul. 26, 1999

Related U.S. Application Data
(60) Provisional application No. 60/120,634, filed on Feb. 18, 1999.

(51) Int. Cl.[7] .................................................. F21V 33/00
(52) U.S. Cl. ........................ 362/476; 362/464; 362/466; 362/526; 362/524
(58) Field of Search .................... 362/476, 464, 362/465, 466, 467, 526, 527, 524, 472

(56) References Cited

U.S. PATENT DOCUMENTS

| | | | |
|---|---|---|---|
| 2,286,338 * | 6/1942 | Bruno | 362/472 |
| 3,631,328 | 12/1971 | Borst et al. | 318/623 |
| 3,979,649 | 9/1976 | Persha | 318/17 |
| 4,115,841 | 9/1978 | Alexander | 362/44 |
| 4,233,652 * | 11/1980 | Oswald | 362/472 |
| 4,353,110 * | 10/1982 | Ellis | 362/35 |
| 4,833,573 | 5/1989 | Miyauchi | 362/466 |
| 4,858,080 | 8/1989 | Oikawa | 362/466 |
| 5,282,589 | 2/1994 | Branigan | 244/114 R |
| 5,355,131 | 10/1994 | Metz | 340/981 |
| 5,580,148 * | 12/1996 | Liao | 362/493 |
| 5,584,560 * | 12/1996 | Gosswiller et al. | 362/524 |
| 5,589,901 | 12/1996 | Means | 396/12 |
| 5,707,129 | 1/1998 | Kobayashi | 362/464 |
| 5,785,405 | 7/1998 | Huhn | 362/459 |
| 5,785,413 | 7/1998 | Tillinghast et al. | 362/228 |

FOREIGN PATENT DOCUMENTS 850 802 A2   7/1998   (EP) ................. B60Q/1/76

* cited by examiner

Primary Examiner—Stephen Husar
Assistant Examiner—Ronald E. Delgizzi
(74) Attorney, Agent, or Firm—Larry J. Palguta; Michael A. Forhan (57) ABSTRACT

An electronically controlled, programmable searchlight (1), particularly useful for mounting on helicopters. The searchlight (1) uses a digital electronic control circuit (30) in conjunction with rotary potentiometers (32), (34) to control movement of the searchlight (1). Adjustable trimpots (22) are employed to provide the searchlight (1) with preset positions, each preset position having an easily alterable operating envelope. The searchlight (1) may have light sources (50, 52) of varying type, which may also be controlled by the electronic control circuit (30).

10 Claims, 7 Drawing Sheets

ELECTRONICALLY CONTROLLED SEARCHLIGHT HAVING MULTIPLE PRESET POSITIONS

CROSS-REFERENCES TO RELATED APPLICATIONS

This application claims the benefit of U.S. Provisional Application No. 60/120,634, filed Feb. 18, 1999.

BACKGROUND AND SUMMARY OF THE INVENTION

Aircraft, and in particular helicopters, commonly employ searchlights for illumination during nighttime operation. Initially, such search lights were either hand held or fixed to the helicopter body. In time, helicopter searchlights were developed that allowed for crude control over the aiming of the light beam. This was generally accomplished by manually adjusting the position of the light via a handle or other apparatus extending into the helicopter.

Eventually, technology allowed for the creation of searchlights that could be controlled by electronic switches operated by the pilot from within the helicopter. These searchlights typically utilize analog circuitry containing electromechanical relays to switch electric current, and micro-switches to detect searchlight position. Such a system allows the searchlight to operate within a specific range of motion determined by the physical placement of the micro-switches.

There is currently a demand for a programmable helicopter searchlight having preset searchlight positions, wherein more flexible and readily adaptable operating envelopes are available. Existing searchlights using analog technology and micro-switches do not allow for this flexibility.

The present invention satisfies this need by providing a searchlight with multiple preset positions, that can be controlled with a discrete digital electronic circuit in conjunction with position sensing rotary potentiometers. In searchlights employing both a visible and an infrared beam, the circuit can also control which type of light is turned on. The potentiometers provide an input voltage to the electronic circuit that is proportionate to the position of the searchlight. The electronic circuit compares these voltages to preset values from a bank of adjustable trimpots located on the circuit board. A trimpot is assigned to each significant point in the searchlight's operating envelope. Based on the voltage comparison, the electronic logic circuit controls switching of the motors that move the searchlight. The operating envelope and the position of each preset can be altered merely by adjusting the corresponding trimpot on the circuit board.

In another embodiment of the invention, a microprocessor controlled electronic circuit is contemplated. In this embodiment, the operating envelope and position of the presets are adjustable by reprogramming the circuits rather than by adjusting the trimpots.

DETAILED DESCRIPTION OF THE PREFERRED EMBODIMENT(S)

Figure 1:
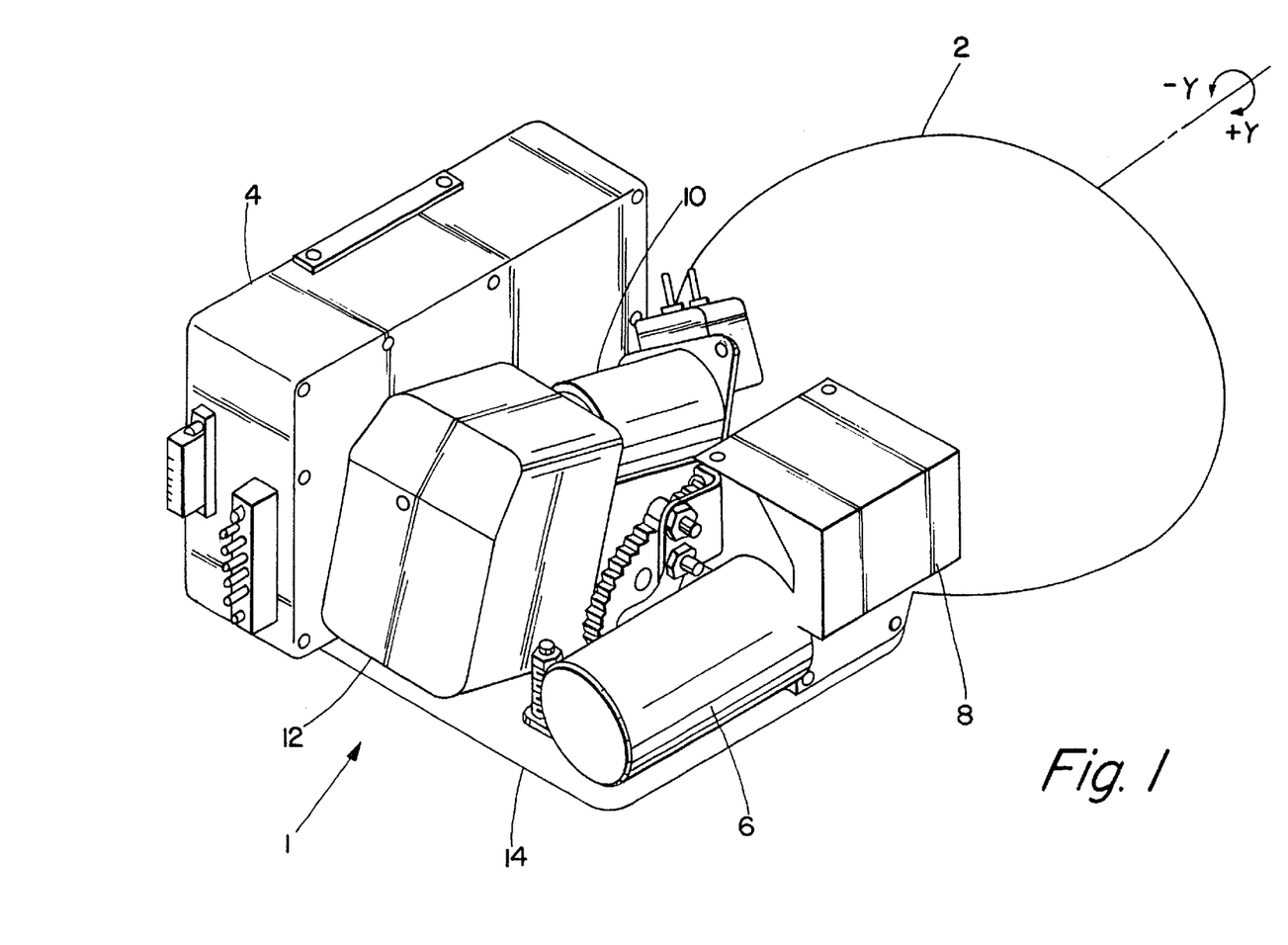
FIG. 1 shows a perspective view of the searchlight of the present invention prior to mounting on a helicopter.

A preferred embodiment of the electronically controlled searchlight (1) of the present invention can be seen in FIG. 1. The searchlight (1) has a controllable lighthead (2) which can adjustably extend, retract, and rotate. A first motor (6) and a first gearbox (8) are provided to extend and retract the lighthead (2). There is also a second motor (10) and a second gearbox (12) provided to rotate the lighthead (2). The electronic components used to operate the searchlight (1) are preferably located within a sealed control housing (4). The lighthead (2), first motor (6), first gearbox (8), second motor (10), second gearbox (12), and control housing (4) may all be mounted on a common base (14). The base may then be mounted to a helicopter or other aircraft.

Figures 2A, 2B:
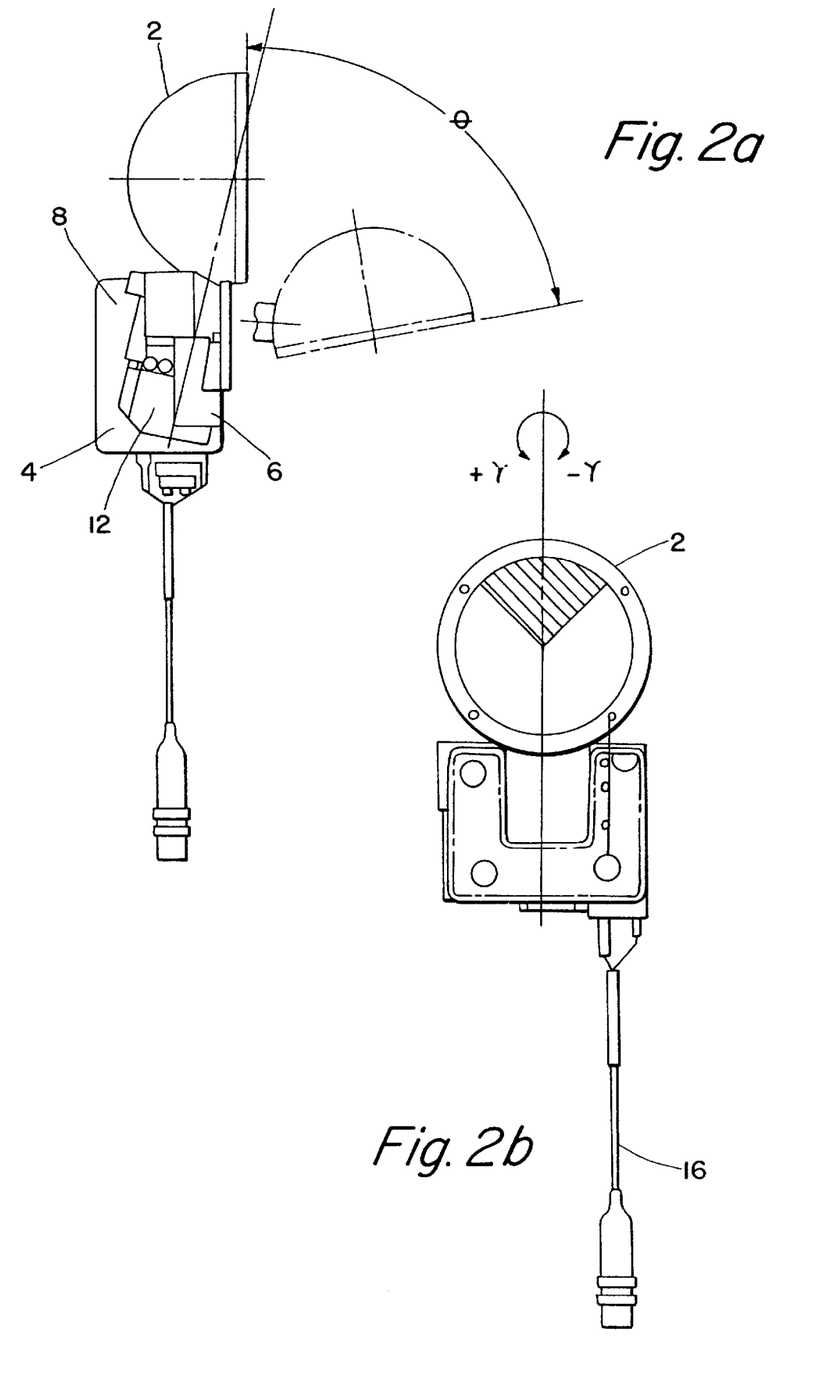
FIG. 2a depicts side elevation view of a preferred embodiment of the searchlight of the present invention.
FIG. 2b depicts a bottom plan view of a preferred embodiment of the searchlight of the present invention.

Referring to FIG. 2, a side view and a bottom view of one preferred embodiment of the searchlight (1) may be observed. In the side view of the preferred embodiment of the searchlight (1), the adjustable extension range θ of the lighthead (2) is shown. Preferably, the adjustable extension range θ of the lighthead (2) is between approximately 0 degrees and approximately 120 degrees, and more preferably is approximately 80 degrees. The adjustable rotation range γ of the lighthead (2), is depicted in the bottom view of a preferred embodiment of the searchlight (1). The adjustable rotation range γ of the lighthead (2) is preferably between approximately −120 degrees and +120 degrees. More preferably the adjustable rotation range γ may be from approximately −60 degrees to approximately +90 degrees in this embodiment.

There are preferably two sensing devices, such as rotary potentiometers, (32, 34) (FIGS. 4 and 5) used to detect the position of the lighthead (2). In a preferred embodiment of the invention, there may be a rotary potentiometer (32, 34) located in each of the first gearbox (8) and second gearbox (12). As the first gearbox (8) or the second gearbox (12) operate to respectively extend or rotate the lighthead (2), the corresponding rotary potentiometer (32) or (34) provides an input voltage to the electronic control circuit (30) (FIG. 4) proportionate to the position of the lighthead.

Figure 3:
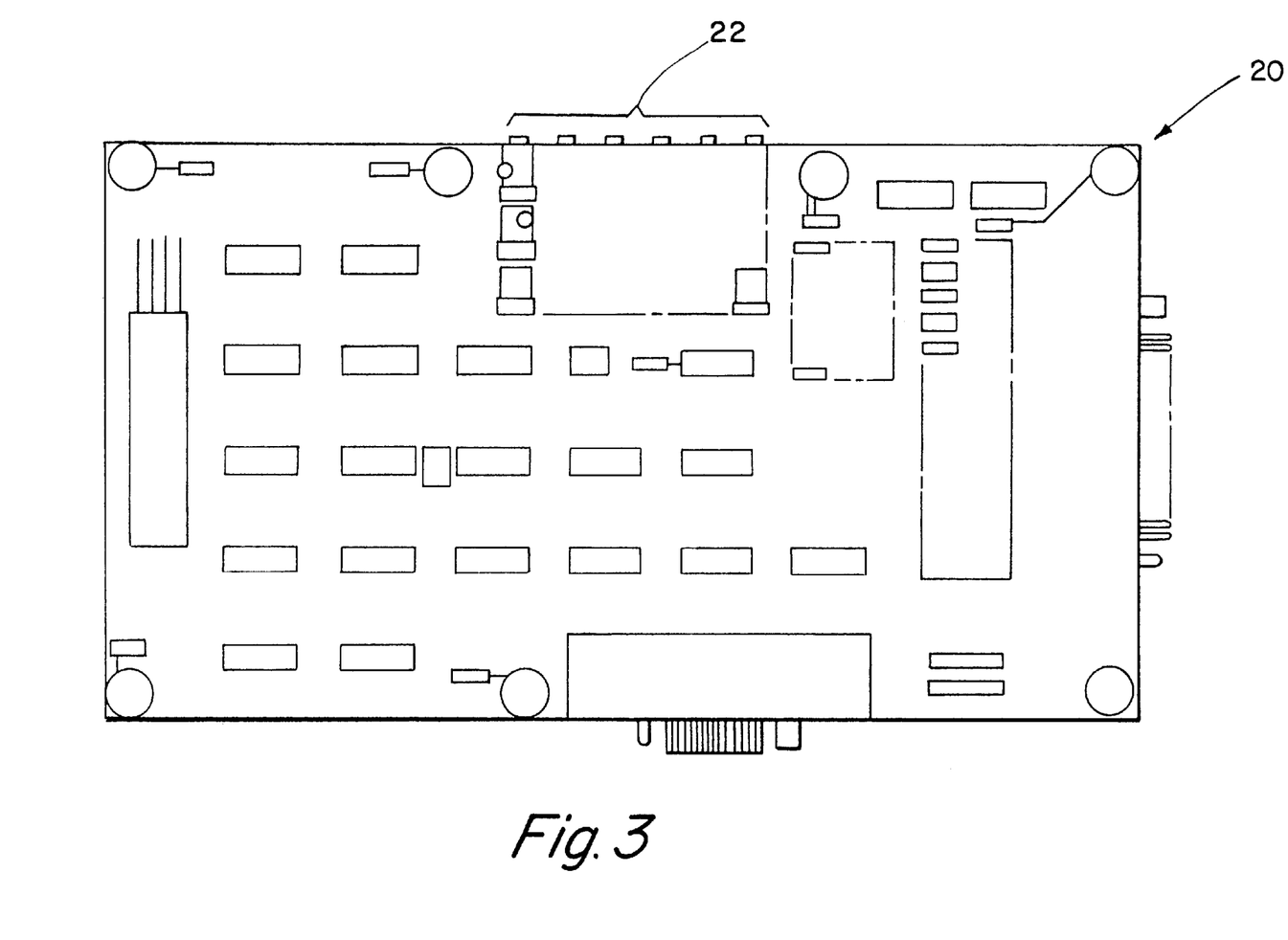
FIG. 3 illustrates a control board and trimpots for controlling the motion and position of a preferred embodiment of the searchlight of the present invention.
Figure 4:
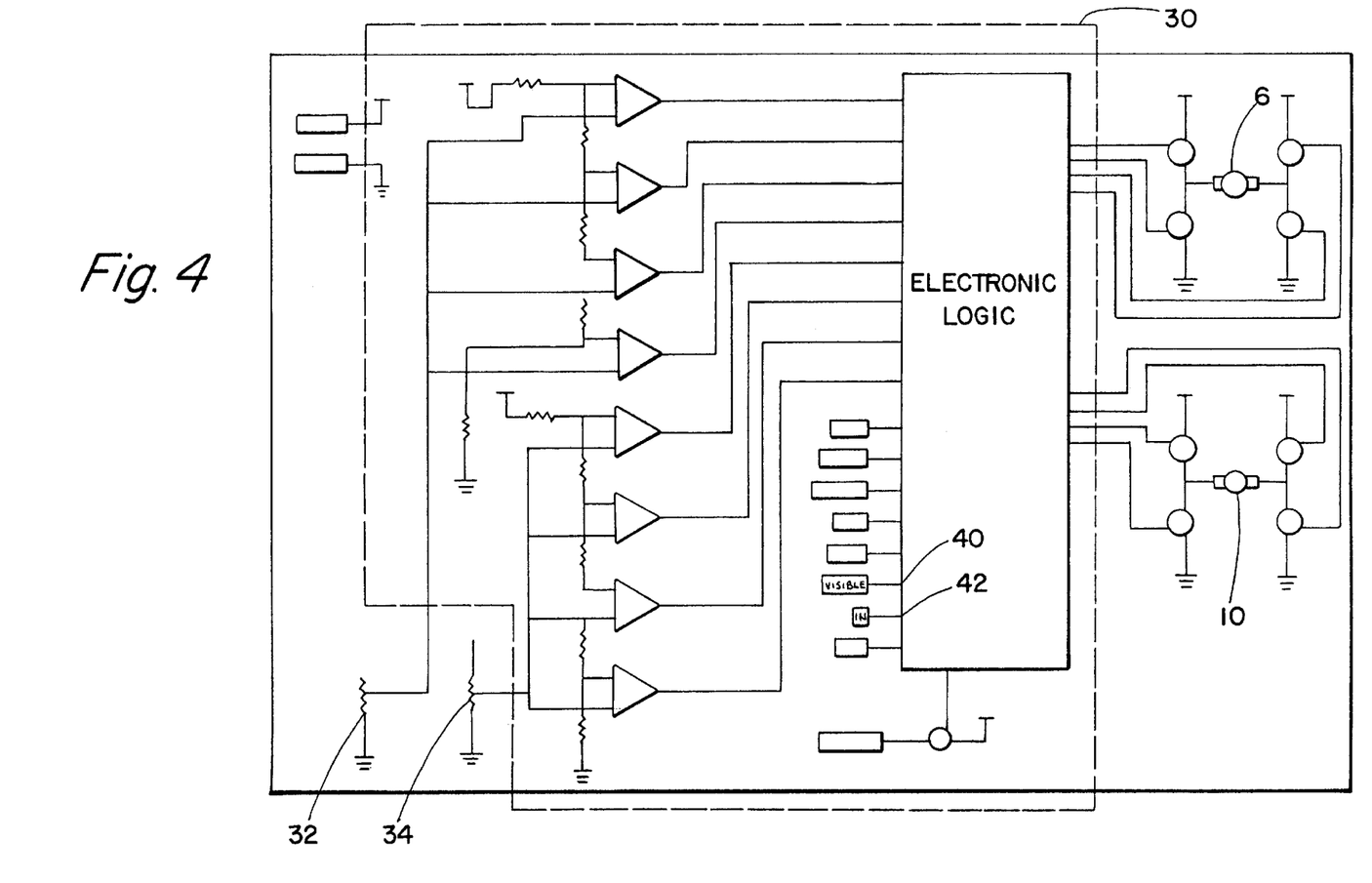
FIG. 4 depicts a preferred embodiment of an electronic control circuit for controlling the searchlight of the present invention.

FIG. 3 illustrates a control board (20) used to control operation and movement of the searchlight(1). The control board (20) contains the electronic control circuit (30) (FIG. 4). There is a device, preferably a bank of adjustable trimpots, (22) located on the control board (20) that are used to set the operating envelope for the lighthead (2). When the electronic control circuit (30) (FIG. 4) receives an input voltage from one or both of the rotary potentiometers (32, 34), it compares the voltage to the corresponding preset values set by the associated trimpots (22). Based on this comparison, the electronic control circuit (30) operates the motors (6, 10) as necessary to move the lighthead (2).

The searchlight (1) may be provided with a multitude of preset positions. In one preferred embodiment, the searchlight (1) has presets for stowed position, landing position, extended position, retracted position, rotated left position, and rotated right position. A trimpot is preferably allocated to each significant point in the operating envelope of the lighthead (2). Thus, for purposes of illustration and not limitation, in this preferred embodiment of the invention there is a trimpot allocated to the following operating points: landing position (40 degrees); fully extended position (120 degrees); fully retracted position (0 degrees);maximum rotation left (60 degrees); maximum rotation right (90 degrees); and centered (0 degrees rotation). Each of the trimpots (22) may be adjusted to alter its respective portion of the operating envelope of the lighthead (2). The searchlight (1) may also incorporate other automated features, such as preventing lighthead (2) movement when no light is illuminated, and automatic return of the lighthead to the landing position upon command.

A schematic diagram of the electronic control circuit (30) for the searchlight may be seen in FIG. 4. Inputs from the rotary potentiometers (32, 34) are connected to the control board (20) and used by the electronic control circuit (30) to send the proper output to the motors (6, 10).

Figure 5:
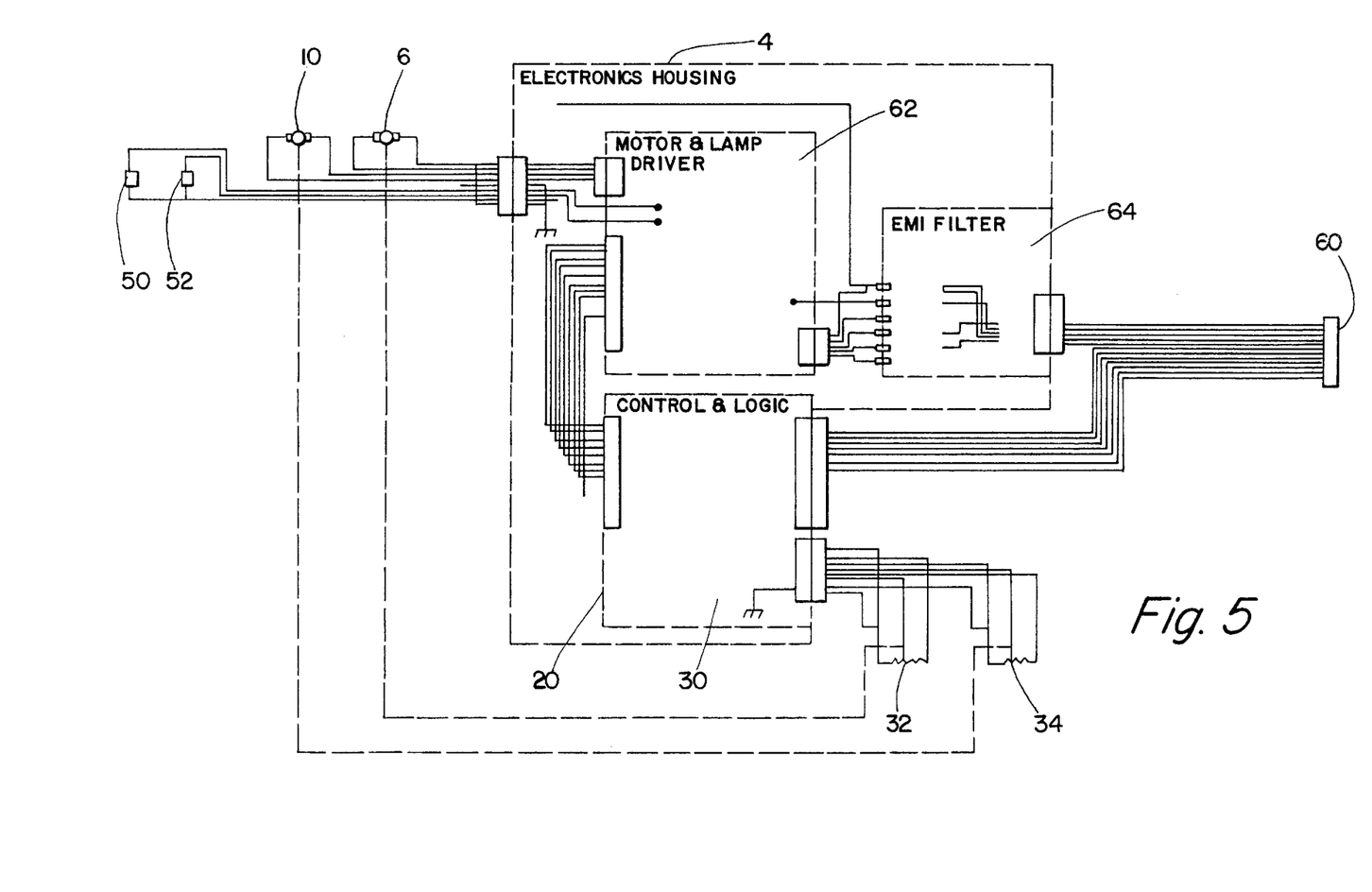
FIG. 5 is a schematic wiring diagram for a preferred embodiment of the searchlight of the present invention.

FIG. 5 illustrates a schematic wiring diagram of one embodiment of the searchlight of the present invention. Inputs are received by the electronic control circuit (30), which resides on the control board (20), via wires 16 (FIG. 2) extending from the connector (60). Inputs are also sent to the control circuit (30) by the rotary potentiometers (32, 34). The control circuit (30) processes these inputs to determine the proper output signal to send to the motors (6, 10) and the lamps (50, 52) via a motor and lamp driver circuit (62). Certain inputs from the connector (60), such as power, may pass through an EMI filter (64), such filters being well known in the art, to be filtered for interference prior to entering the motor and lamp driver circuit (62). Preferably, the control circuit (30), motor and lamp driver circuit (62), and EMI filter (64) are contained within a control housing (4).

Figure 6:
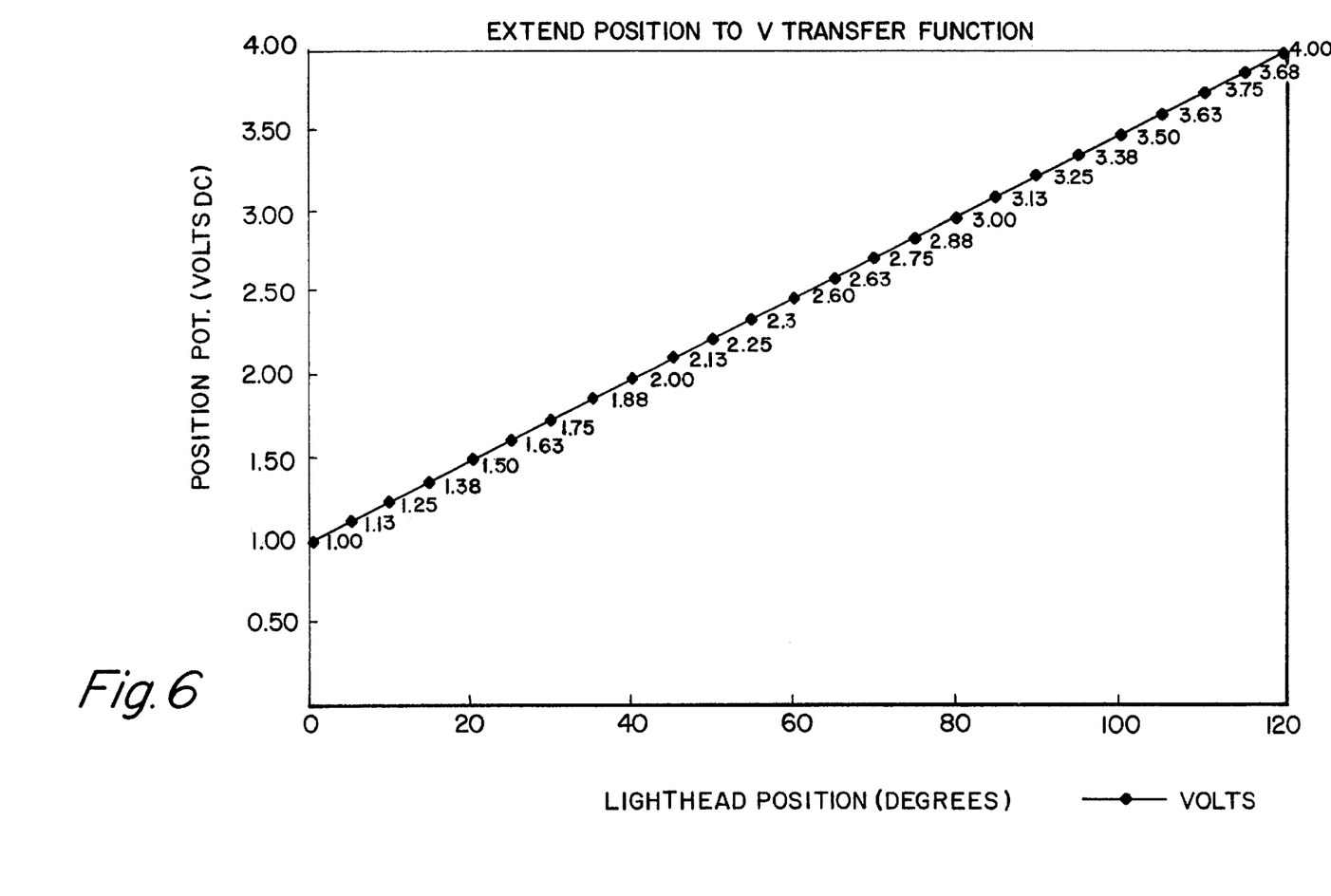
FIG. 6 is a graph showing an example of the extended position of the lighthead in relation to the voltage setting of a corresponding trimpot.
Figure 7:
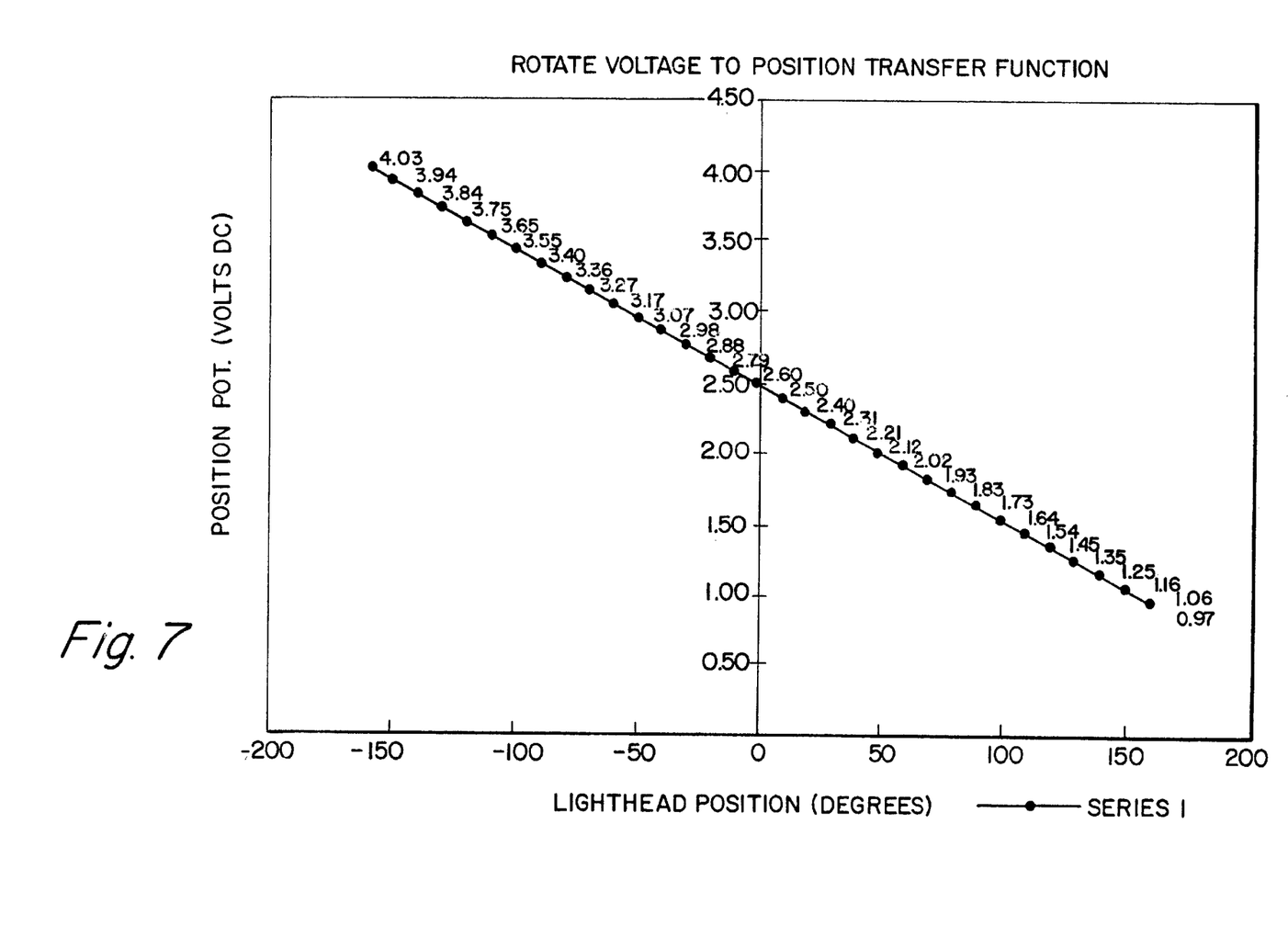
FIG. 7 is a graph showing an example of the rotated position of the lighthead in relation to the voltage setting of a corresponding trimpot.

Referring now to the graph of FIG. 6, the relationship between the setting of the trimpot 22 (FIG. 3) corresponding to lighthead extension and the position of the lighthead (2) may be observed. It can be seen that as the voltage output of the trimpot is increased, the amount of lighthead (2) extension also increases. Similarly, FIG. 7 illustrates the relationship between trimpot setting and the respective rotational position of the lighthead (2).

It is often desirous that helicopter searchlights employ more than one type of light. For example, in a preferred embodiment of the searchlight (1), there may be a visible light source (50) (FIG. 5) for general illumination, as well as an infrared light source (52) (FIG. 5) not visible to the human eye, for use with night vision goggles. Infrared light may be especially useful in the law enforcement field, for example, where it may be used in conjunction with a helicopter or other vehicle to covertly track suspects. The electronic control circuit (30) (FIG. 4) can also control multiple light sources, as can be seen by reference to the light source inputs (40, 42) of FIG. 4. In a preferred embodiment of the searchlight (1), solid state switches may be used to drive all installed lamps. Use of solid state switches reduces the inrush current to the lamp, which helps to extend bulb life.

In an alternate embodiment of the present invention, a micro-processor controlled electronic circuit (not shown) for operating the searchlight (1) is contemplated. As in the previous embodiment, the lighthead (2) would still operate within a predefined range of motion. However, the range of motion may be altered by reprogramming the microprocessor to adjust the corresponding circuit instead of manually adjusting a trimpot. A micro-processor based control circuit provides more flexibilty and a wider range of possible features than a control circuit utilizing trimpots.

The present invention satisfies the need for an electronically controlled searchlight that can be easily adjusted to meet specific requirements. The awkward and time consuming task of moving micro-switches has been eliminated. By utilizing an electronic control circuit employing trimpots or a micro-processor, adjustments to the searchlight's operating range may be made quickly and with little effort. Additionally, the present invention also allows for a multitude of preset searchlight positions, all of which are easily adjustable.

The scope of the invention is not to be considered limited by the above disclosure, and modifications are possible without departing from the spirit of the invention as evidenced by the following claims.

What is claimed is:

1. An electronically controllable searchlight, said searchlight comprising:
   a moveable lighthead containing at least one lamp;
   at least one motor for moving said lighthead;
   a digital electronic circuit for controlling the movement of said lighthead;
   at least one device for sensing the position of said lighthead and communicating said position to said digital electronic control circuit;
   a plurality of devices for adjusting presettable lighthead positions, thereby determining the operating envelope of said lighthead; and
   a sealed housing, wherein the electronic circuit is located within the sealed housing.

2. The electronically controllable searchlight of claim 1, further comprising a base, wherein the searchlight is adapted for use on a helicopter, the housing is mounted on the base and the base is securable to the helicopter.

3. The electronically controllable searchlight of claim 2, wherein said lighthead and said at least one motor are mounted on said base.

4. An electronically controllable searchlight, said searchlight comprising:
   a moveable lighthead containing at least one lamp;
   at least one motor for moving said lighthead;
   a digital electronic circuit for controlling the movement of said lighthead;
   at least one device for sensing the position of said lighthead and communicating said position to said digital electronic control circuit, the device comprising a rotary potentiometer; and
   a plurality of devices for adjusting presettable lighthead positions, thereby determining the operating envelope of said lighthead.

5. The electronically controllable searchlight of claim 4, further comprising a gearbox coupling the motor and lighthead, the potentiometer being located in said gearbox.

6. The electronically controllable searchlight of claim 5, further comprising a sealed housing and a base, wherein the electronic circuit is located within the sealed housing, and the motor, gearbox, and sealed housing are mounted on the base.

7. An electronically controllable searchlight, said searchlight comprising:

a moveable lighthead containing at least one lamp;

at least one motor for moving said lighthead;

a digital electronic circuit for controlling the movement of said lighthead;

at least one device for sensing the position of said lighthead and communicating said position to said digital electronic control circuit; and a plurality of trimpots for adjusting presettable lighthead positions, thereby determining the operating envelope of said lighthead.

8. The electronically controllable searchlight of claim 7, wherein the presettable lighthead positions can be modified by adjustment of said trimpots.

9. An electronically controllable searchlight, said searchlight comprising:

a moveable lighthead containing multiple lamps, one of which produces light in the visible spectrum and another of which produces light in the infrared spectrum;

at least one motor for moving said lighthead;

a digital electronic circuit for controlling the movement of said lighthead;

at least one device for sensing the position of said lighthead and communicating said position to said digital electronic control circuit; and a plurality of devices for adjusting presettable lighthead positions, thereby determining the operating envelope of said lighthead.

10. The electronically controllable searchlight of claim 9, wherein the electronic circuit includes solid state switches for driving the lamps to limit the inrush of current to the lamps thereby helping to extend bulb life.

* * * * *